United States Patent [19]

Martin

[11] Patent Number: 5,052,804
[45] Date of Patent: Oct. 1, 1991

[54] NON-IMAGING OPTICAL DETECTOR WITH VARIABLE FIELD-VIEW

[75] Inventor: Frederick Martin, Menlo Park, Calif.

[73] Assignee: GTE Government System Corporation, Stamford, Conn.

[21] Appl. No.: 607,976

[22] Filed: Nov. 1, 1990

[51] Int. Cl.⁵ ............................................ G02B 23/10
[52] U.S. Cl. ................................ 356/256; 250/458.1; 359/886
[58] Field of Search ................ 356/256, 318; 350/312; 250/458.1; 307/425

[56] References Cited

U.S. PATENT DOCUMENTS

| | | | |
|---|---|---|---|
| 4,292,526 | 9/1981 | Marling | 250/458.1 |
| 4,717,828 | 1/1988 | Liu | 356/318 |
| 4,829,597 | 5/1989 | Gelbwachs | 250/458.1 |

Primary Examiner—F. L. Evans
Attorney, Agent, or Firm—James J. Cannon, Jr.

[57] ABSTRACT

A non-imaging optical telescope having a variable field-of-view utilizes an atomic resonance filter within its non-reflective tube. The atomic resonance filter received incoming light through the aperture of the telescope and re-emits the light to an optical sensor. The field-of-view is a function of the distance of the atomic resonance filter from the aperture. A positioning mechanism is provided to move the atomic resonance filter within the tube, thereby varying the field-of-view.

1 Claim, 3 Drawing Sheets

NON-IMAGING OPTICAL DETECTOR WITH VARIABLE FIELD-VIEW

BACKGROUND OF THE INVENTION

This invention pertains to the field of optical sensors or detectors generally and, in particular to that class of optical sensors which are non-imaging. Specifically, it pertains to techniques for controlling the field-of-view of a non-imaging optical sensor or detector.

Traditional methods for controlling the field-of-view of an optical sensor or detector involve complex arrangements or lenses or field stops. One approach is to design a lens with three or more elements, whose relative positions are adjusted to affect a change in the focal length of the lens, and hence the field of view. Another approach is to design a lens having a constant focal length, placing a variable aperture at the focal plane of the lens to serve as a field stop. Both of these approaches encounter practical difficulties for a large field-of-view. When the field-of-view exceeds 60° full angle, the physcial aperture of the lens exceeds the pupil, or optical aperture, of the sensor. For example, a lens system with a 190° field-of-view with a pupil of ten inches (10") would be twenty-one feet (21') in diameter and sixty feet (60') long.

There is a class of optical applications that does not require the use of imaging detectors or sensors. A laser communications system using an atomic resonance filter (ARF) is an example of non-imaging optical system. The atomic resonance filter (ARF), comprised of vapors of specific atoms, has been developed recently as a new type of narrow band optical filter. (Cf. "Atomic resonance filers", Jerry A. Gelbwachs, IEEE Journal of Quantum Electronics, Vol. 24, No. 7, July 1988, and U.S. Pat No. 4,829,597). The atomic resonance filter is an optical filter which does not preserve the optical coherence of the incoming light and, consequently, all imaging qualities are lost in such a filter. Thus, there is no specific advantage to using an imaging system for defining the field-of-view for an optical detector using an atomic resonance filter. This is particularly true when large apertures are needed to collect weak signals over very wide fields-of-view.

SUMMARY OF THE INVENTION

The principal object of this invention is to provide an optical sensor or detector with a variable field-of-view which overcomes the practical limitations of the prior art.

A further object of the invention is to provide a non-imaging telescope with a variable field-of-view.

in a first aspect of this invention, a non-imaging optical telescope with a variable field-of-view utilizes a non-reflecting, telescopic, cylindrical tube having an aperture at one end. An atomic resonance filter of generally cylindrical shape is snuggly fitted within said tube, such that the light-receiving face of said filter is situated to receive light entering said tube through said aperture An optical sensor is situated at the output side of and coupled to said atomic resonance filter to sense re-emitted light from said filter. Moving said atomic resonance filter and said optical sensor as a unit axially within said tube, varies the distance of said atomic resonance filter from said aperture, thereby varying the field of view of said telescope.

DESCRIPTION OF THE PREFERRED EMBODIMENT

Figure 1:
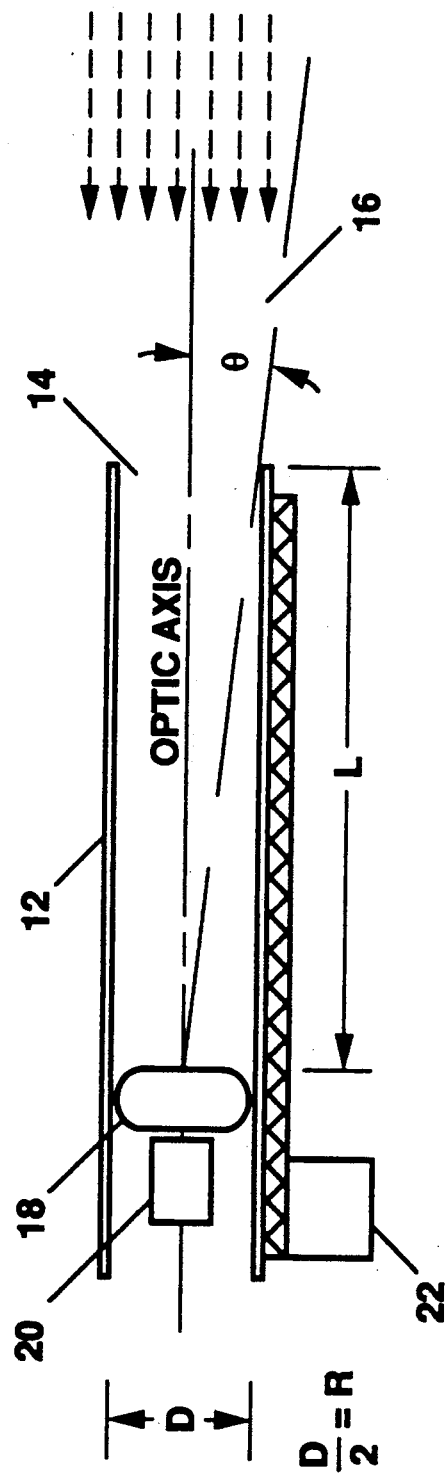
FIG. 1 is diagrammatic illustration of the preferred embodiment of a non-imaging optical detector and telescope with a variable field-of-view.

FIG. 1 is a diagrammatic view of the preferred embodiment of a non-imagining optical detector or sensor constructed with a telescope. Only the non-reflecting tube 12 of the telescope in shown in FIG. 1. Tube 12 has an aperture 14 to receive incoming light, designated generally by the reference number 16. An optical atomic resonance filter 18 is positioned within tube 12 to collect the incoming light. Typically, incoming light 16 of a specific wavelength entering the atomic resonance filter 18 elevates the atoms therein into an excited state, which state then deploys in a two- or multi-step cascade, emitting light at different wavelengths. A suitable optical sensor 20 is positioned to detect and collect re-emitted light signals from the atomic resonance filter 18. The optical sensor converts the detected re-emitted light signals to electrical signals proportional to the intensity of said re-emitted light signals. All or most of the incoming light signals 16 are absorbed by the vapor inside atomic resonance filter 18. The vapors re-emit the light signals at new wavelengths. Optical sensor 20, positioned on the output side of atomic resonance filter 18 collects much of the re-emitted light signals, and in turn produces electrical signals at its output.

The purpose of the present invention is to provide a means for varying the field-of-view from which the light is collected. Incoming light 16 fills the aperture 14 of tube 12 and is collected at the surface of the atomic resonance filter 18. The field-of-view angle $\theta$ is a function of the diameter D of the aperture 14 and the distance L from the aperture 14 to the collecting surface of atomic resonance filter 18, which is effectively the length of tube 12. For an aperture 14 having a fixed diameter D, as the distance L increases, the field-of-view angle $\theta$ decreases. Thus, to vary the field-of-view, one has only to provide a means to vary the distance L, which, in turn, is only a means to move the position of atomic resonance filter 18 and sensor 20 within tube 12. A positioning mechanism 22 is provided to move and guide atomic resonance filter 18 and sensor 20, as a unit, along tube 12. Positioning mechanism 22 is calibrated to position atomic resonance filter 18 and sensor 20 at precisely determinable distances from aperture 14 along the length of tube 12. Many alternative constructions are available from the art for positioning mechanism 22. For example, the atomic resonance filter 18 and sensor 20 could remain fixed in some structure and the tube 12 could be moved to vary L.

Figures 2A, 2B:
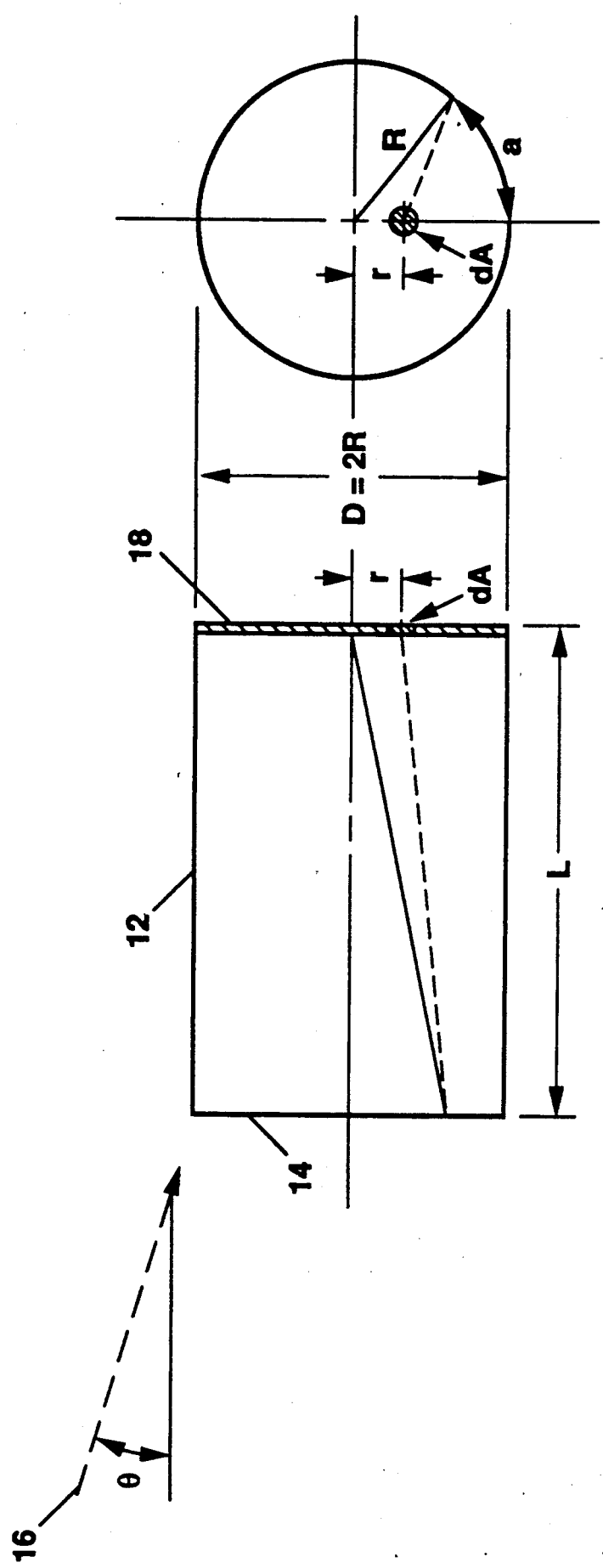
FIG. 2a is a geometric representation of the light shield/cone illustrating the angle of incidence of light on the detector of the embodiment of FIG. 1.
FIG. 2b is a diagrammatic illustration of elements of the detector of the embodiment of FIG. 1.

The operability and the feasibility of the invention depend upon the practical determination of the field-of-view. Referring now to FIGS. 2a and 2b, FIG. 2a shows a geometric representation for incoming light 16 entering the surface of atomic resonance filter 18, said filter having a radius R(R=D/2), enclosed in a cylindrical light shield, provided by tube 12, of distance L from aperture 14. To determine θ, the surface area of atomic resonance filter 18 is subdivided into infinitesimal elements of area dA, as shown in FIG. 2b. Then the optical solid angle Ω for each element dA is computed. The solid angle is defined in the conventional fashion:

$$\Omega = \frac{4\pi}{\pi R^2} \int_0^r r\, dr \int_0^\pi (1 - \cos\phi) da = 2\pi(1 - \cos\theta)$$

$$\cos\phi = \frac{L}{\sqrt{L^2 + R^2 + r^2 - 2rR\cos a}};$$

where R is the radius of tube 12, a is the angle that a radial vector from the rim of aperture 14 makes with an axis running through the center of tube 12 and a point on the surface of filter 18, L is the length of tube 12, and r is the distance of dA from the center of atomic resonance filter 18. This double integral can be evaluated numerically. First, the integral over the angle a can be evaluated analytically. Then, the contributions from the total area of the atomic resonance filter 18 are summed, and the sum is normalized to the total area of the atomic resonance filter 18. This yields an average value for the solid angle over the area of atomic resonance filter 18.

Figure 3:
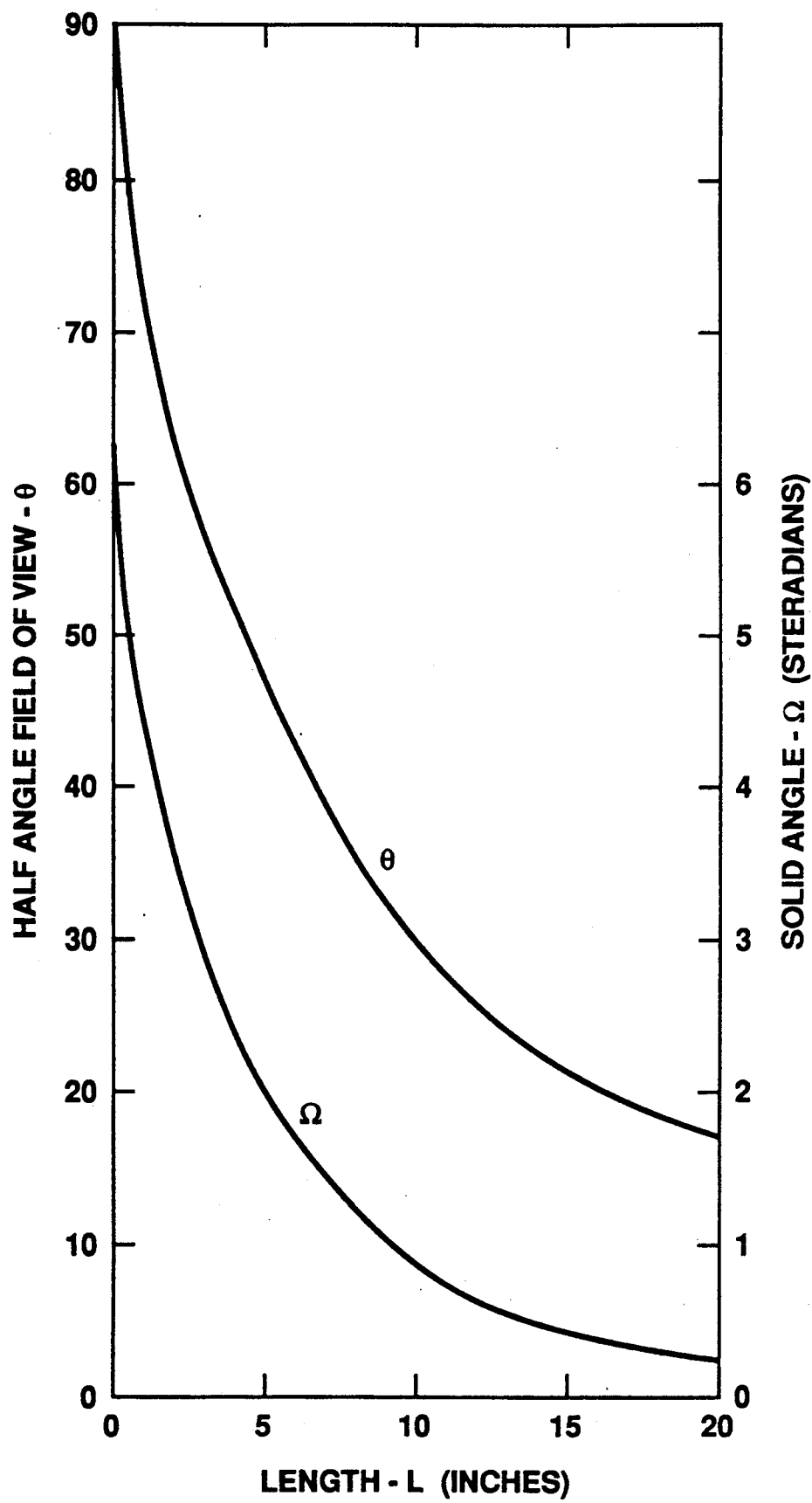
FIG. 3 is a graph plotting the field-of-view and solid angle of a detector having a ten-inch pupil, according to the embodiment of FIG. 1.

Performing these calculations for a number of values for the distance L inside tube 12, the angle θ, and the radius R of atomic resonance filter 18, one skilled in the art can readily see that the values for the solid angle and the field-of-view are significantly larger than those for a design using a fixed lens. FIG. 3 shows a specific example for a tube 12 having a diameter of ten inches (10″). Those skilled in the art will alos recognize that the solid angle field-of-view, the mid-point angle, the half-area angle and the projected field-of-view angles are remarkably similar; that is, they convey the same information. It will also be obvious to one skilled in the art that if the cylinder 12 of FIG. 2a is infinitely long, it would be equivalent to using a field lens to decouple the field-of-view from the aperture of the detector tube 12.

I claim:

1. A non-imaging optical telescope with a variable field-of-view, comprising:
   a non-reflecting, telescopic, cylindrical tube of a certain diameter having an aperture at one end thereof;
   an atomic resonance filter of generally cylindrical shape snuggly fitted within said tube, such that the light-receiving face of said filter is situated to receive light entering said tube through said aperture;
   an optical sensor situated at the output side of and coupled to said atomic resonance filter to sense re-emitted light from said filter; and
   positioning means to move said atomic resonance filter and said optical sensor as a unit axially within said tube to vary the distance of said atomic resonance filter from said aperture, thereby varying the field of view of said telescope.

* * * * *